US008705065B2

(12) United States Patent
Matsushita

(10) Patent No.: US 8,705,065 B2
(45) Date of Patent: Apr. 22, 2014

(54) SYSTEM, DEVICE AND STORAGE DEVICE STORING A PROGRAM FOR SELECTIVELY PREVENTING SCANNED IMAGES FROM BEING DISPLAYED

(75) Inventor: Satoshi Matsushita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 636 days.

(21) Appl. No.: 12/731,569

(22) Filed: Mar. 25, 2010

(65) Prior Publication Data

US 2010/0245883 A1    Sep. 30, 2010

(30) Foreign Application Priority Data

Mar. 26, 2009 (JP) .................................. 2009-075709

(51) Int. Cl.
*G06K 15/00*  (2006.01)
(52) U.S. Cl.
USPC ........ 358/1.14; 358/1.13; 358/1.15; 382/118; 713/186
(58) Field of Classification Search
USPC .................... 358/1.13–1.16; 726/5; 382/118; 713/186; 340/5.1, 5.2
See application file for complete search history.

(56) References Cited

U.S. PATENT DOCUMENTS

| 6,167,462 | A  * | 12/2000 | Davis et al. ....................... 710/5 |
| 6,714,317 | B2 * | 3/2004  | Lu .................................. 358/1.2 |
| 7,019,858 | B1 * | 3/2006  | Gopalasamy ................ 358/1.15 |
| 7,099,023 | B2 * | 8/2006  | Chrisop et al. ............... 358/1.14 |
| 7,113,948 | B2 * | 9/2006  | Jhingan et al. ........................ 1/1 |
| 7,301,659 | B2 * | 11/2007 | Timperman et al. ......... 358/1.15 |
| 7,466,449 | B2 * | 12/2008 | Jacobs ........................... 358/1.9 |
| 8,218,165 | B2 * | 7/2012  | Matsushima ................ 358/1.14 |
| 8,325,369 | B2   | 12/2012 | Miyazawa et al. |
| 8,339,639 | B2 * | 12/2012 | St. Jacques et al. ......... 358/1.15 |

(Continued)

FOREIGN PATENT DOCUMENTS

| JP | HEI 05-153414 | 6/1993 |
| JP | 2007-195005 A | 8/2007 |
| JP | 2008-259138 A | 10/2008 |

OTHER PUBLICATIONS

Notification of Reasons for Rejection dated Dec. 6, 2011 received from the Japanese Patent Office from related Japanese Application No. 2010-069361, together with an English-language translation.

(Continued)

*Primary Examiner* — Dennis Dicker
(74) *Attorney, Agent, or Firm* — Scully, Scott, Murphy & Presser, PC

(57) ABSTRACT

An image scanning system includes (1) an image scanning device, which includes an input unit configured to acquire an instruction by a user, an image scanner configured to scan an image and generate image data and a transmitting unit configured to transmit the image data; (2) a display lock judging unit configured to judge whether a display lock is necessary based on whether a predetermined instruction is acquired by the input unit; and (3) a data processing device which includes a first reception unit configured to receive the image data transmitted by the transmitting unit of the image scanning device, a first display unit configured to display the image data received by the first reception unit and a display control unit configured to control the first display unit so as not to display the image data if the display lock judging unit judges that the display lock is necessary.

11 Claims, 5 Drawing Sheets

(56) References Cited

U.S. PATENT DOCUMENTS

| | | | |
|---|---|---|---|
| 8,405,858 B2 | 3/2013 | Yoshida | |
| 8,553,256 B2 | 10/2013 | Ohara | |
| 2002/0020940 A1* | 2/2002 | Kiritani | 264/272.15 |
| 2002/0067224 A1 | 6/2002 | Wen | |
| 2003/0020940 A1* | 1/2003 | Nakamura et al. | 358/1.13 |
| 2004/0128555 A1* | 7/2004 | Saitoh et al. | 713/201 |
| 2005/0286080 A1* | 12/2005 | Lee et al. | 358/1.15 |
| 2006/0061799 A1* | 3/2006 | Okamoto et al. | 358/1.14 |
| 2006/0177255 A1* | 8/2006 | Mizoi | 400/62 |
| 2006/0195802 A1* | 8/2006 | Nakayama | 715/867 |
| 2006/0236366 A1* | 10/2006 | Walczyk | 726/1 |
| 2007/0239845 A1* | 10/2007 | Sueshige | 709/217 |
| 2008/0148370 A1* | 6/2008 | Allwright | 726/5 |
| 2008/0266467 A1* | 10/2008 | Okamoto et al. | 348/739 |
| 2010/0188684 A1* | 7/2010 | Kumara | 358/1.14 |

OTHER PUBLICATIONS

Office Action dated Sep. 13, 2012 received in a related U.S. Patent Application, namely U.S. Appl. No. 12/729,554.

* cited by examiner

SYSTEM, DEVICE AND STORAGE DEVICE STORING A PROGRAM FOR SELECTIVELY PREVENTING SCANNED IMAGES FROM BEING DISPLAYED

CROSS-REFERENCE TO RELATED APPLICATION

This application claims priority under 35 U.S.C. §119 from Japanese Patent Application No. 2009-075709 filed on Mar. 26, 2009. The entire subject matter of the application is incorporated herein by reference.

BACKGROUND

1. Technical Field

The following descriptions relate to an image scanning device, an image scanning system employing the image scanning device, and computer readable recording medium storing program for a computer connected with the image scanning device.

2. Prior Art

Conventionally, an image scanning system configured such that image data and the like are exchanged between personal computers and a scanner have been known. In such an image scanning system, a so-called "push scan" setting is generally known. When the "push scan" setting is in effect, when a user operates a scanner to execute a scanning operation, scanned image data is transmitted to a PC (personal computer) and is automatically displayed on a display non it of the PC. In such a setting, therefore, there is a possibility that information (e.g., confidential information) may be viewed by a third person and leak.

SUMMARY OF THE INVENTION

In consideration of the above problem, aspects of the present invention are advantageous in that an improved scanning device, scanning system and recording medium containing a program for the scanning device are provided.

An image scanning system includes (1) an image scanning device, which includes an input unit configured to acquire an instruction by a user, an image scanner configured to scan an image and generate image data and a transmitting unit configured to transmit the image data; (2) a display lock judging unit configured to judge whether a display lock is necessary based on whether a predetermined instruction is acquired by the input unit; and (3) a data processing device which includes a first reception unit configured to receive the image data transmitted by the transmitting unit of the image scanning device, a first display unit configured to display the image data received by the first reception unit and a display control unit configured to control the first display unit so as not to display the image data if the display lock judging unit judges that the display lock is necessary.

According to further aspects of the invention, there is provided with a recoding medium containing a computer-executable program for a computer which is configured to receive image data from a scanning device. The program contains instructions which cause the computer to executed the steps of (a) receiving the image data from the scanning unit, (b) judging whether the image data received from the scanning device is allowed to be displayed, and (c) disabling displaying of the image data received by the image data receiving unit if the judging step judges that the image data received from the scanning device is not allowed to be displayed.

According to furthermore aspects of the invention, there is provided an image scanning device communicatably connected to a data processing device which is configured to receive image data and display the image data on a display unit. The scanning device includes a display lock command acquiring unit configured to acquire a user input of a display lock command which disables the data processing device from displaying the image data received from the scanning device on the display unit, an image data transmission unit configured to transmit the image data to the data processing device, and a command transmission unit configured to transmits a display lock command device when a predetermined condition is satisfied.

BRIEF DESCRIPTION OF THE ACCOMPANYING DRAWINGS

DETAILED DESCRIPTION OF THE EMBODIMENT

Hereinafter; referring to the accompanying drawings, an embodiment according to aspects of the invention will be described.

Figure 1:
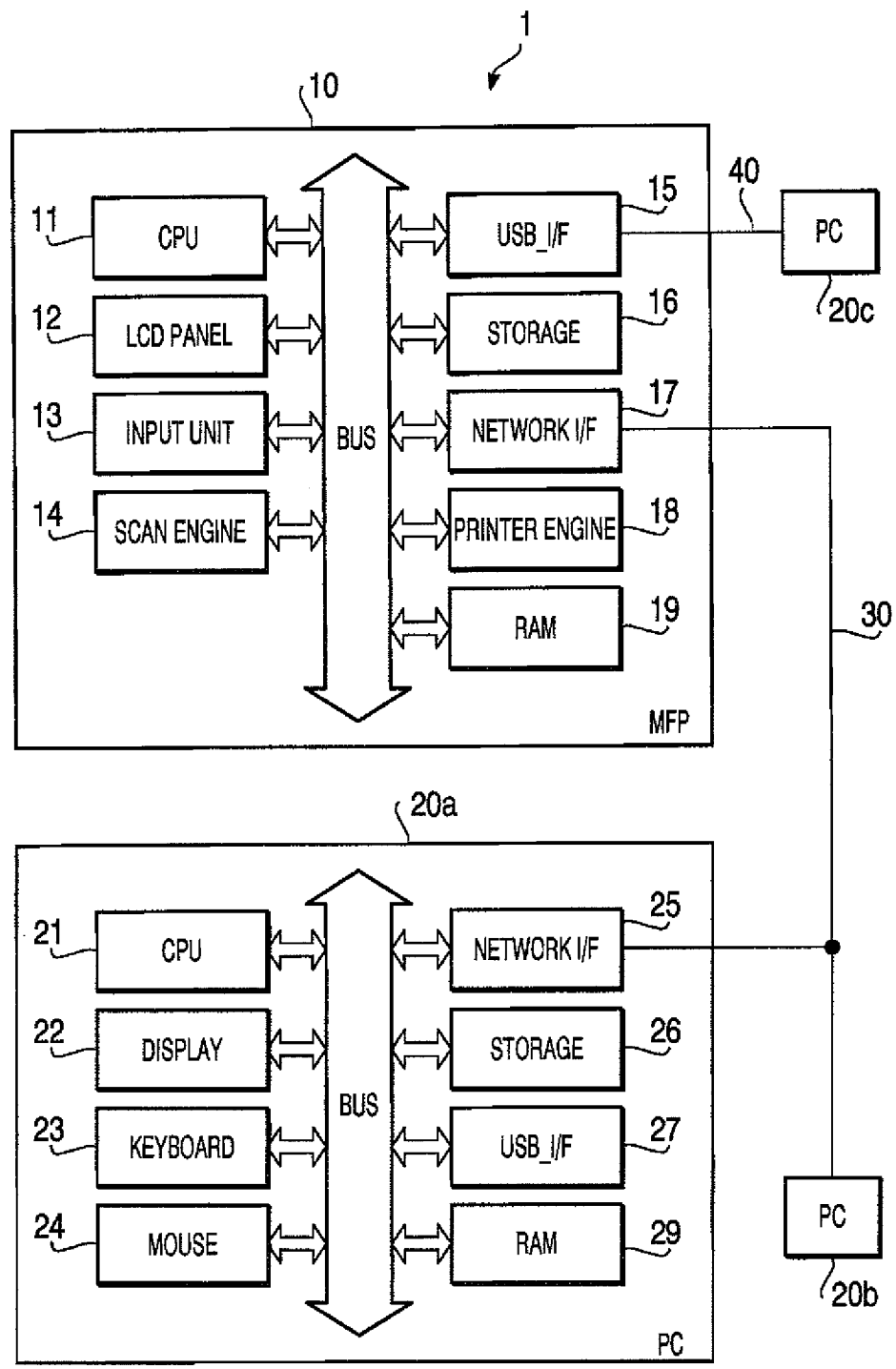
FIG. 1 is a block diagram showing a configuration of an image scanning system according to aspects of the invention.

An image scanning system 1 (see FIG. 1) includes an MFP (multi-function peripheral) 10 having functions of a printer, scanner, copier and facsimile machine, and personal computers (PCs) 20a, 20b and 20c. The MFP 10 is connected to the PCs 20a and 20c through a LAN (local area network), while the MFP 10 is connected to the PC 20c through a USB (universal serial bus) cable.

The MFP 10 includes a CPU (central processing unit) 11, an LCD (liquid crystal display) panel 12, an input unit 13, a scanner engine 14, a USB I/F 15, a storage 16, a network I/F 17, a printer engine 18, and a RAM (random access memory) 19, which are interconnected through a bus. The storage 16 includes a non-volatile storing medium such as a hard disk, a flash memory and the like, and used as a data storage when each functions of the MFP 10 is used. The CPU 11 executes various processes by executing programs stored in the storage 16. The RAM 19 provides a memory space allowing the CPU 11 to read/write data.

The LCD panel 12 is for displaying various pieces of information. The input unit 13 includes mechanical switches and a touch panel, through which the CPU 11 acquires user input. The scanner engine 14 operates under control of the CPU 11 to scan an image on an original which is placed on a predetermined scanning position and generates image data. One piece of image data consists of a plurality of image data blocks. Generation, transmission, and reception of the image data are executed on image data block basis. The USB I/F 15 executes a communication process with USB devices (e.g., PC 20c) in accordance with the USB standard. The network I/F 17 communicates with devices on the LAN 30 (e.g., PC 20a and PC 20b). The printer engine 18 prints out images on a printing medium under control of the CPU 11.

The PC 20a includes a CPU 21, a display 22, a keyboard 23, a mouse 24, a network I/F 25, a storage 26, a USB I/F 27 and a RAM 29, which are interconnected through a bus. The storage 26 stores various types of software including an OS (operating system), various application programs, device drivers for controlling the MFP 10. The application programs include a image display application, a word processing application, a spreadsheet application and the like. The device drivers include a scanner driver for controlling the scanner engine 14, a printer driver for controlling the printer engine 18 and the like. The CPU 21 executes such software to execute various processes.

The RAM 29 provides a memory space allowing the CPU 21 to read/write data. The CPU 11 preserves the memory spaces for the various types of software, respectively. For example, when the scanner driver and the image display application are executed, memory spaces for the scanner driver and the image display application are preserved, respectively.

The display 22 displays various pieces of information. The keyboard 23 is a well-known keyboard and acquires user input. The mouse 24 is a well-known mouse and acquires the user's operation. The network I/F 25 allows a communication with another device (e.g., MFP 10) on the LAN 30. The USB I/F 27 executes a communication process with USB devices (e.g., MFP 10) in accordance with the USB standard.

The PC 20b and PC 20c have the similar configuration as the PC 20a and detailed description will be omitted for brevity.

A push scan according to a first embodiment, which is executed by the image scanning system 1 will be described in detail with reference to FIGS. 2 and 3. In the following description, an exemplary case where image data generated by the MFP 10 is transmitted to the PC 20a via the LAN 30 will be explained.

Figure 2:
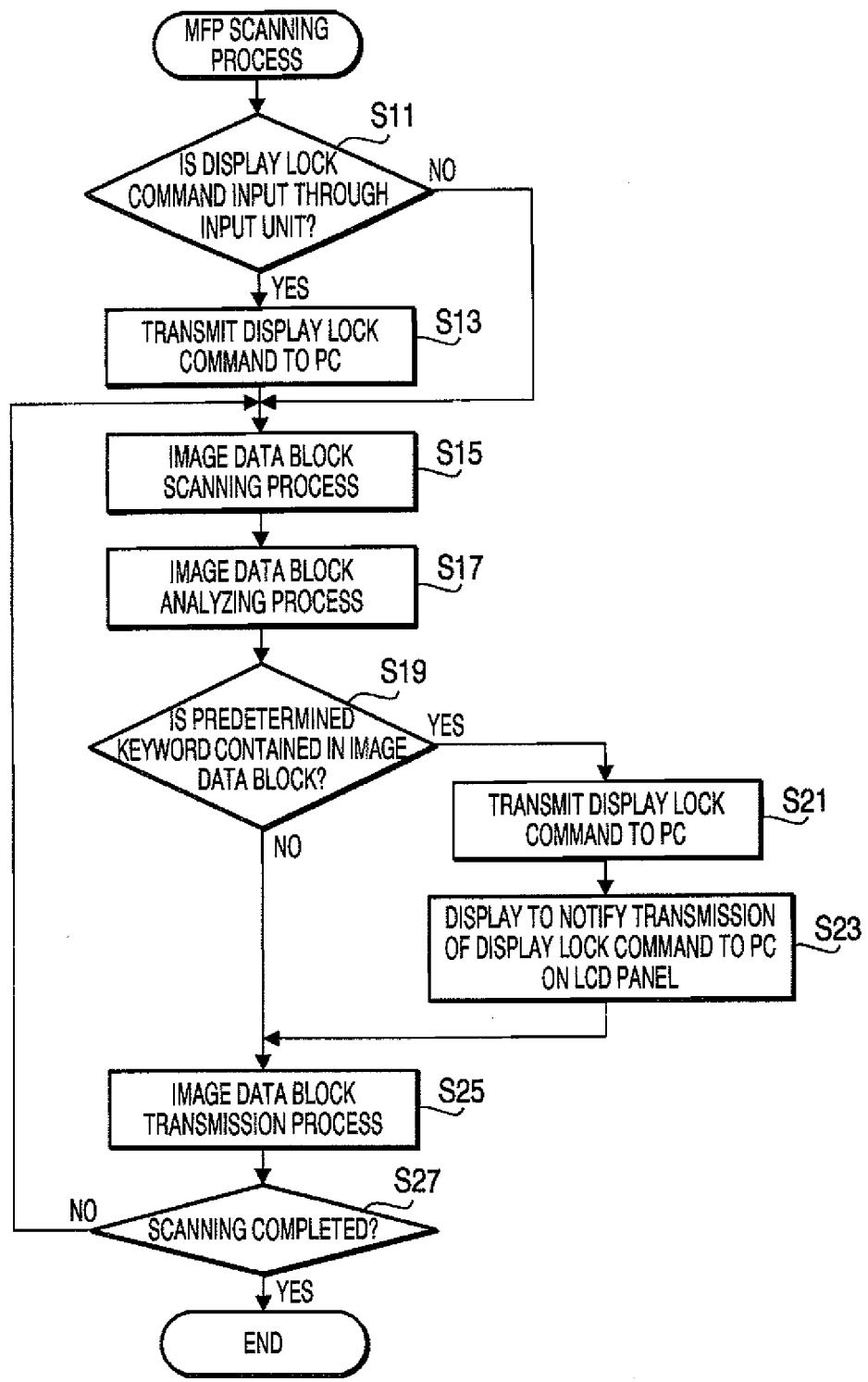
FIG. 2 shows a flowchart illustrating a scanning process executed by an MFP (multi-function peripheral) according to a first embodiment of the invention.
Figure 3:
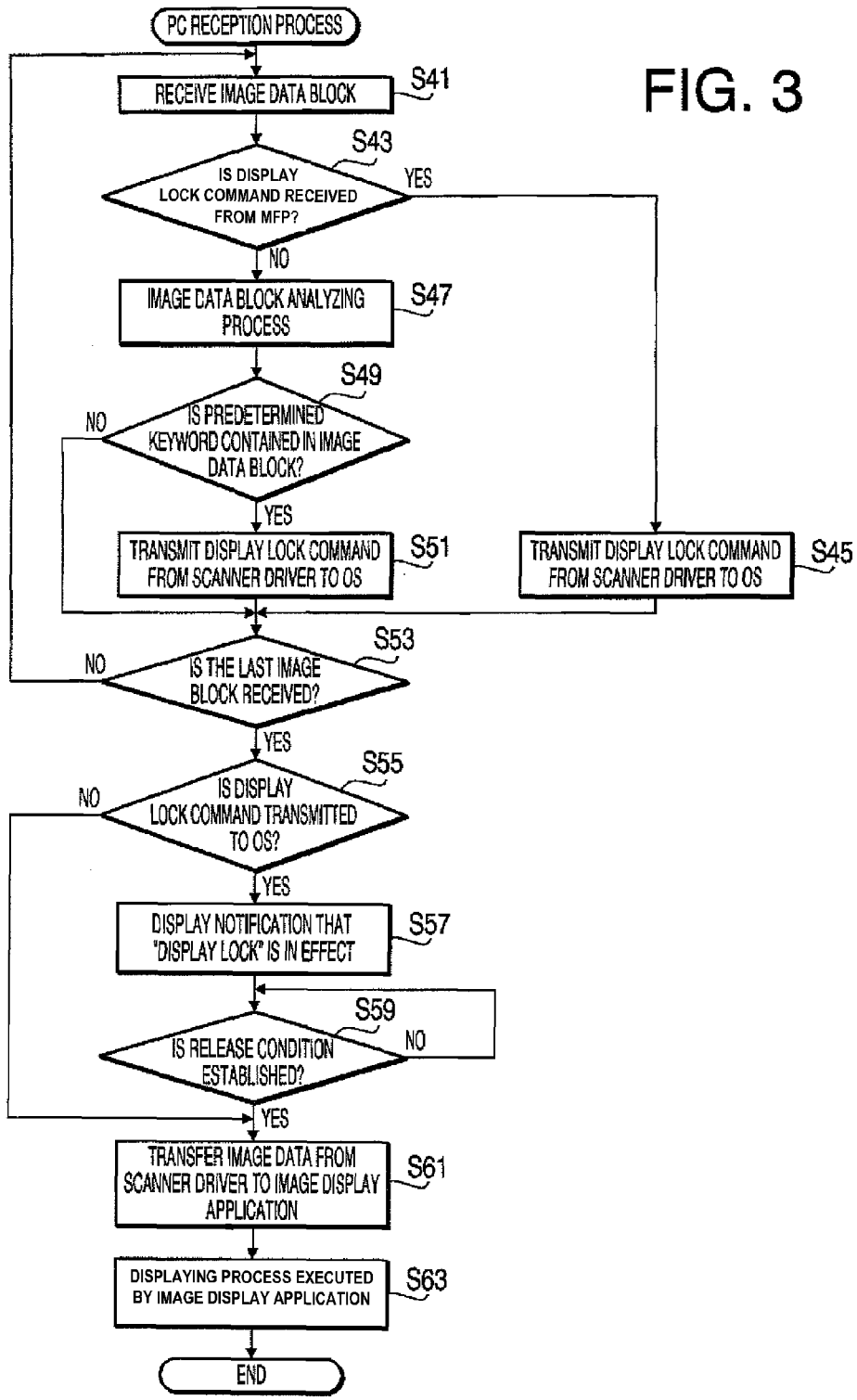
FIG. 3 shows a flowchart illustrating a image data reception process executed by a PC according to the first embodiment of the invention.

FIG. 2 shows a flowchart illustrating a scanning process executed by the MFP 10. When the user sets an original to be scan to the MFP 10, selects the PC 20a as a destination of the image data and inputs a command to start the push scan with use of the input unit 13, the CPU 21 starts the push scan process.

For example, when the user starts the scanning process, buttons corresponding to "Normal Scan" and "Secure Scan" may be displayed on the LCD panel 12. The "Normal Scan" is a scanning which is not associated with a "display lock" instruction, and the "Secure Scan" is a scanning which is associated with the "display lock" instruction. When the user touch one of the displayed buttons, the touch panel provided on the LCD panel 12 acquires the user input. According to the embodiment, if the user intends to scan an original of which the confidentiality should be protected, the user touches the "Secure Scan" button, otherwise the user touches the "Normal Scan" button. Further, in order to allow the user to select a destination, buttons respectively corresponding to PC 20a to PC 20c are displayed on the LCD panel 12. When the user touches one of the buttons corresponding to the PCs 20a-20c, the PC corresponding to the touched button is set as a destination of the image data.

In response to the user input of the instruction to start the push scan, the CPU 11 transmits a push scan preparation command to the PC 20a, which is selected as the destination. Then, control proceeds to S11.

In S11, the CPU 11 judges whether the display lock command is input through the input unit 13. The display lock command is a command which causes the PC 20a (hereinafter, it is assumed that the PC 20a has been selected as the destination) to prevent the image data from displayed on the display 22 of the PC 20a. Specifically, according to the embodiment, when the "Secure Scan" button is touched, the CPU 11 judges that the display lock command has been input.

If the CPU 11 judges that display lock command has not been input (S11: NO), the control proceeds to S15. If the CPU 11 judges that the display lock command has been input (S11: YES), the control proceeds to S13. In S13, the CPU 11 transmits the display lock command to the PC 20a through the LAN 30.

In S15, the CPU 11 executes an image data block scanning process, in which the original placed on the scanning position is scanned on block basis, and image data block corresponding to the scanned block is generated.

In S17, the CPU 11 executes an image data block analyzing process. Specifically, the CPU 11 recognizes characters contained in the image data block with use of an well-known OCR (optical character recognition) technique.

In S19, the CPU 11 executes a keyword searching process, which is a process for searching the character data obtain by the OCR technique for predetermined keywords. The predetermined keywords may include "internal use only," "confidential," "agreement," and the like. Optionally, or alternatively, the keywords may have been determined by the user in advance. With use of the keywords, it is possible to automatically determine whether the currently scanned original is a confidential document. If the CPU 11 judges that the none of the keywords is contained in the image data block (S19: NO), the control proceeds to S25. If the CPU 11 judges that one or more of the keywords are contained in the image data block (S19: YES), the control proceeds to S21.

In S21, the CPU 11 transmits the display lock command to the PC 20a through the LAN 30. Then, in S23, the CPU 11 displays the notification that the display lock command has been sent to the PC 20a on the LCD panel 12. Thus, regardless whether the user selected the "Secure Scan" or "Normal Scan" button, if the image data block contains one or more of the predetermined keywords, the display lock command is automatically transmitted to the PC 20a.

In S25, the CPU 11 executes an image data block transmitting process, in which the image data block is transmitted from the MFP 10 to the PC 20a.

In S27, the CPU 11 judges whether the scanning of the original has been completed. If the scanning has not been completed (S27: NO), that is, if there remains one or more blocks to be scanned, the control returns to S15. If the scanning has been completed (S27: YES), the scanning process shown in FIG. 2 is finished.

Next, an image data reception process executed by the PC 20a (or 20b, 20c) will be described with reference to FIG. 3.

When the PC 20a receives the push scan preparation command from the MFP 10, the PC 20a (i.e., the CPU 21) boots the scanner driver and the image display application, and then the control proceeds to S41.

In S41, the scanner driver receives the image data on block basis, and stores the image data block as received in the memory space preserved for the seamier driver.

In S43, the scanner driver judges whether the display lock command has been received from the MFP 10. If the display lock command has been received (S43: YES), the control proceeds to S45, where the scanner driver transmits the display lock command to the OS. Upon receipt of the display lock command, the OS locks display of the image data on the display 22 (the OS prevents the image data from being displayed on the display 22). For example, the OS sets the PC

20a such that the PC 20a cannot be operated or referred to. That is, the OS may cause the user to log off with the scanner driver is kept executed. With such a control, since the user is required to input a user name and/or a password for authentication in order to log in, an unauthorized person is prevented from operating the PC 20a to browse the image data.

Further, in S45, the OS interrupts transferring of the image data from the scanner driver to the image display application in response to reception of the display lock command. Then, the control proceeds to S53.

Since the image display application displays the image data on the display 22 only when the image data has been received. Therefore, by controlling data transfer to the image display application, to display or not to display the image on the display 22 can be controlled. With such a control, regardless whether the image display application is implemented with a particular process for display lock, it is ensured that to display or not to display the image can be controlled.

In S43, if the scanner driver judges that the display lock command has not been received (S43: NO), the control proceeds to S47, where the image data block analyzing process is executed. Since the image data block analyzing process is the same as executed in S17, description thereof is omitted here for brevity.

In S49, the keyword searching process is executed. The keyword searching process is similar to the process executed in S17, description thereof is omitted for brevity. If none of the predetermined keywords is contained in the image data block (S49: NO), the control proceeds to S53, while one or more of the predetermined keywords are contained in the image data block (S49: YES), the control proceeds to S51.

In S51, the scanner driver transmits the display lock command to the OS. Then, in response to reception of the display lock command, the OS locks display of the image data on the display 22. The display lock executed by the OS here is the same as that described above (see S45), description thereof is omitted for brevity. Thereafter, the control proceeds to S53.

As described above, the image data block analyzing process is executed in the PC 20a. If it is detected that one or more of the predetermined keywords are contained in the image data block, the display lock command is automatically issued. Therefore, if the PC 20a has a higher data processing capability than the MFP 10, quicker and more accurate image data block analyzing process can be executed by the PC 20a.

In S53, the scanner driver judges whether the last one of the image data blocks transmitted separately from the MFP 10 has been received. If the received image data block is not the last one (S53: NO), the control returns to S41 and receives the next image data block. If the received image data block is that last one (S53: YES), the control proceeds to S55.

In S55, if the scanner driver judges that the display lock command has not been transmitted to the OS (S55: NO), the control proceeds to S61. If the scanner driver judges that the display lock command has been transmitted to the OS (S55: YES), the control proceeds to S57. In S57, the scanner driver displays information indicating that the display lock is in effect on the display 22 of the PC 20a. Thus, the user is notified that the display lock is in effect. Thereafter, the control proceeds to S59.

In S59, the scanner driver monitors whether a release condition of the display lock is fulfilled. An example of such a release condition may be a click of an "OK" button displayed on the display 22. Another example of the release condition is acquiring of a password input by the user through the keyboard 23. If the release condition is not satisfied (S59: NO), the control returns to S59, while if the release condition is satisfied (S59: YES), the control proceeds to S61.

In S61, the scanner driver transfers the image data to the image display application. Specifically, the image data is copied from the memory space assigned to the scanner driver to the memory space assigned to the image display application.

In S63, the image display application displays the transferred image data on the display 22.

According to the first embodiment, when the user inputs the display lock command, the image is prevented from being displayed on the display 22 of the PC 20a. Since the user is allowed to select whether the display lock is applied, the operability may not be impaired, with retaining convenience to the user and security of the confidential information.

Further, according to the first embodiment, even if the user has not input the display lock command, the display lock command is automatically issued if it is detected that the predetermined keywords are contained in the image data by executing the image data block analyzing process. Therefore, leakage of information due to carelessness of the user can be prevented. Further, in such a case, a notification is made to inform that the display lock is applied with used of the LCD panel 12 and/or the display 22, convenience to the user is enhanced.

Second Embodiment

Figure 4:
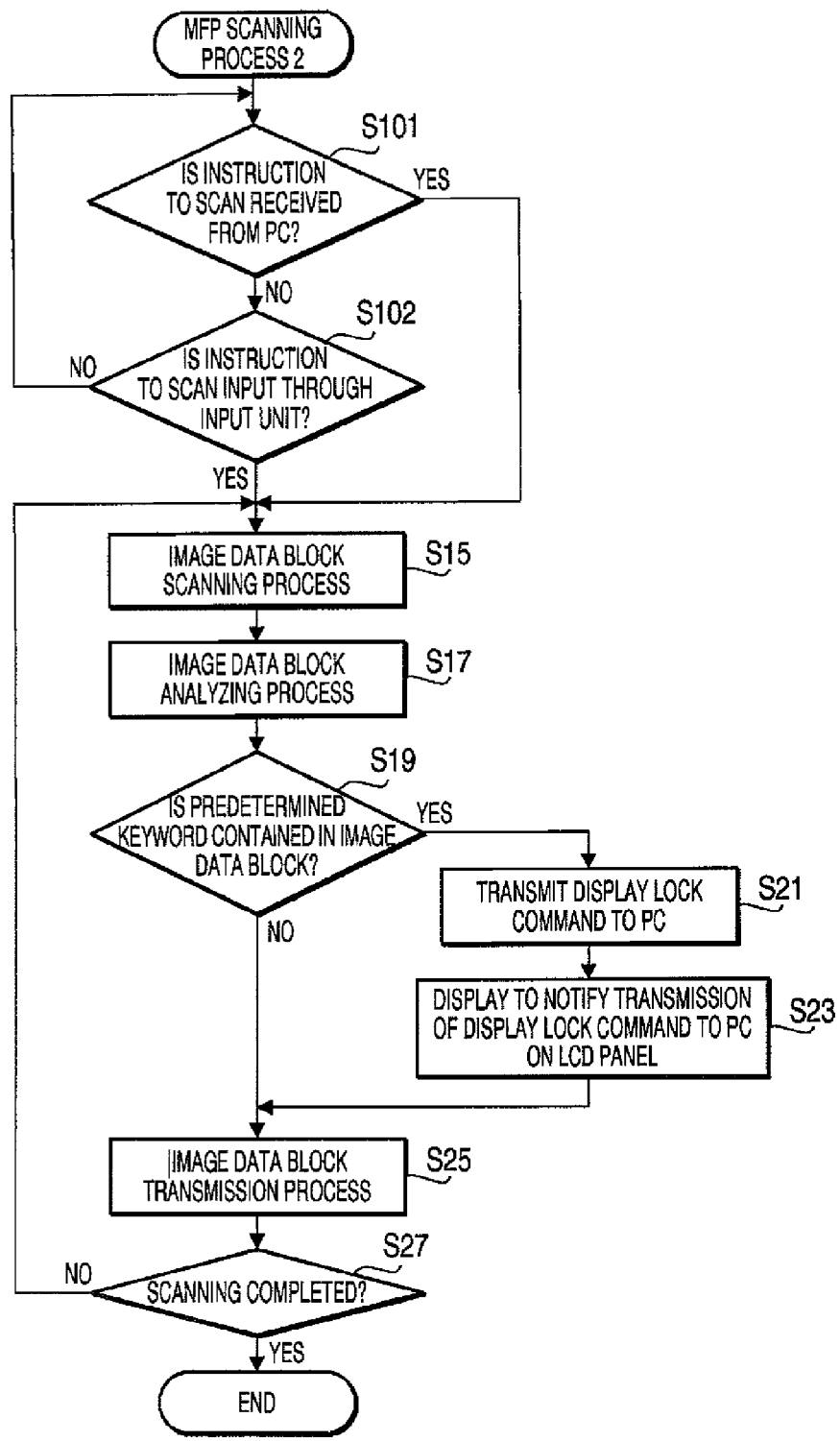
FIG. 4 shows a flowchart illustrating a scanning process executed by the MFP according to a second embodiment of the invention.
Figure 5:
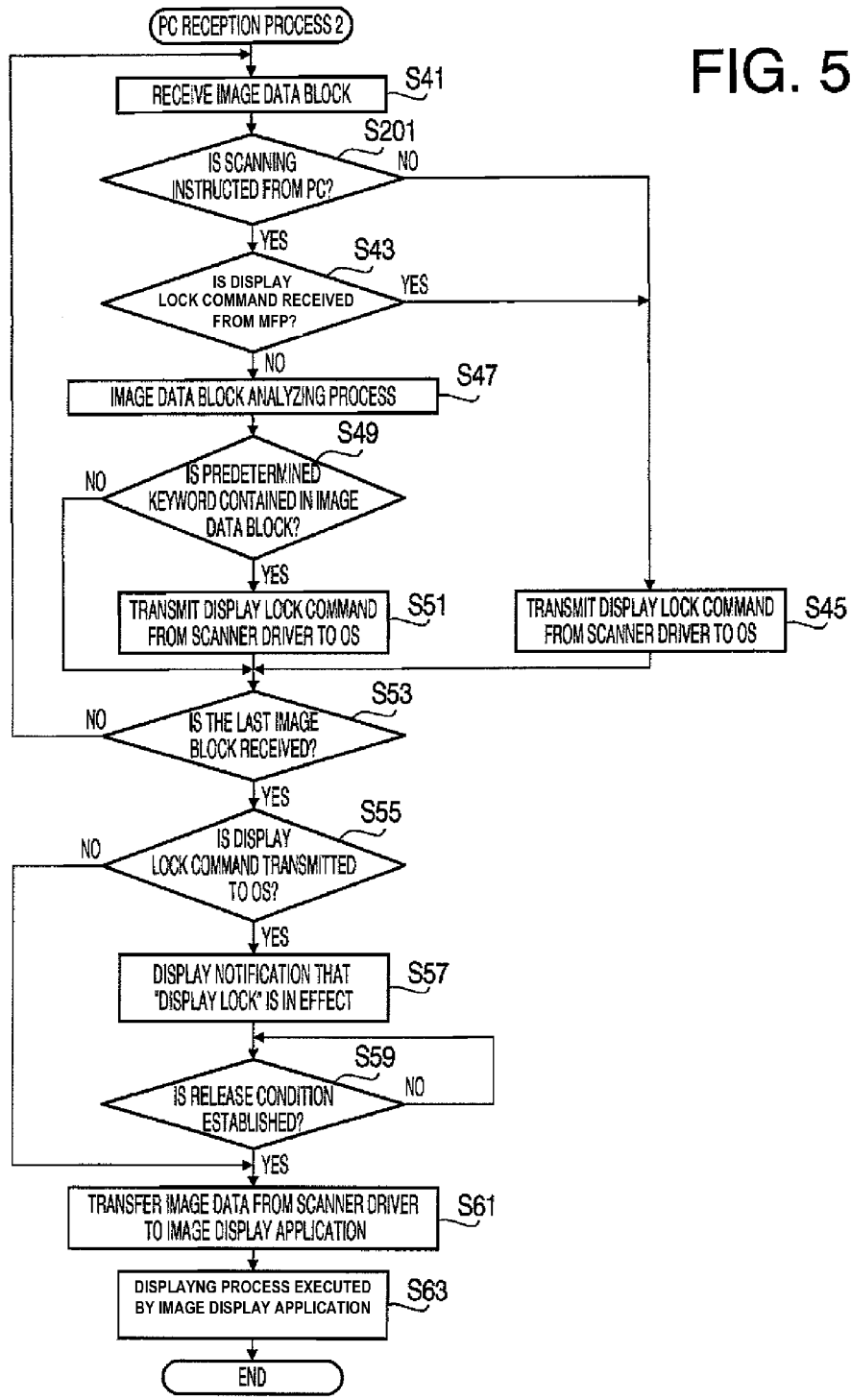
FIG. 5 shows a flowchart illustrating a image data reception process executed by the PC according to the second embodiment of the invention.

Next, the image scanning system according to the second embodiment will be described. It should be noted that the physical configuration of the image scanning system 1 is the same as in the first embodiment. Further, an image scanning process executed by the MFP 10 and an image data reception process executed by the PC 20a (20b or 20c) include the same steps as in the processes according to the first embodiment. Therefore, for the components of the image scanning system, the same reference numbers are used. Further, when describing the image scanning process and the image data reception process with reference to FIGS. 4 and 5, the steps same as those in FIGS. 2 and 3 are indicated with the same step numbers, and description thereof will be omitted for brevity.

According to the second embodiment, when the image scanning process is executed, steps S101 and S102 are executed before S15. In S101, the CPU 11 judges whether a scanning start command is received from the PC 20a (20b, or 20c). If the scanning start command is not received (S101: NO), the control proceeds to S102, where the CPU 11 judges whether the scanning start command is input through the operation unit 13. If the scanning start command has not been input through the operation unit 13 (S102: NO), the control returns to S101. If the scanning start command is received from the PC 20a (S101: YES), or if the scanning start command is input through the operation unit 13 (S102: YES), the control proceeds to S15. The following steps are similar to those shown in FIG. 2.

According to the second embodiment, the MFP 10 starts the image scanning when the scanning start command is received from the PC 20a or input through the operation unit 13, and it is not necessary to input the display lock command when the image scanning is started.

Similarly to the first embodiment, the image data block is analyzed in S17, and if the predetermined keywords are contained in the image data block (S19: YES), the display lock command is automatically transmitted to the PC 20a (S21).

In the image data reception process according to the second embodiment, after the image data block is received in S14, the seamier driver judges whether the scanning start command is received from the PC (S201). If the scanning start command has not been received from the PC 20a (S201: NO), that is, if the scanning start command is input through the input unit 13, the display lock command is transmitted from the scanner driver to the OS (S45). If the scanning start command has been received from the PC 20a (S201:YES), then, similarly to the first embodiment, whether the display lock command is input through the input unit 13 (S43) and whether the predetermined keywords are contained in the data block (S47) are judged, and the process diverges appropriately.

According to the above embodiments, as an example of the display lock, log off from the OS is described. However, the invention needs not be limited to such a configuration, and can be modified in various ways. For example, the display lock may be achieved by causing the scanner driver or the image display application not to display the image data. Alternatively, instead of inhibiting display of the entire image, only a part of the image data may be prevented from being displayed so that an unauthorized person cannot recognize the entire image represented by the image data.

The release condition according to the embodiments may be modified in various ways. For example, if the display lock is achieved by the logging off from the OS, the CPU 21 may judge that the release condition is satisfied when a user, who was logged on when the push scan was started, logs in again.

According to the first embodiment, when the predetermined keywords are contained in the character data (which is included in the image data block), transmission of the display lock command to the PC 20a is indicated on the LCD panel 12 (S23). The configuration may be modified such that the transmission of the display lock command to the PC 20a is always indicated on the LCD panel 12 when transmitted (i.e., after S13), regardless whether the predetermined keywords are contained in the image data block or not.

It should be noted that all the technical components described in the specification and/or illustrated in the drawings provide technical utility alone or any suitable combination thereof, and should not be limited to those described with reference to the exemplary embodiments. Further, the technique described in the specification and/or illustrated in the drawings may achieve a plurality of objects, and technical utility of the technique should be preserved since at least on of the objects are achieved.

What is claimed is:

1. An image scanning system, comprising:
   an image scanning device which includes:
      an input unit configured to acquire an operational instruction by receiving a user operation;
      an image scanner configured to scan an image and generate image data representing the scanned image;
      a transmitting unit configured to transmit the image data generated by the image scanner via a network; and
      a display lock judging unit configured to judge whether a display lock is necessary based on whether a predetermined instruction is acquired by the input unit of the image scanning device; and
   a data processing device which includes:
      a first reception unit configured to receive the image data transmitted by the transmitting unit of the image scanning device via the network;
      a first display unit configured to display the image data received by the first reception unit; and
      a display control unit configured to control the first display unit so as not to display the image data received from the image scanning device via the network if the display lock judging unit judges that the display lock is necessary in response to the predetermined instruction acquired by the input unit of the image scanning device,
   wherein the input unit is configured to receive a scanning start instruction from the data processing device, the image scanner operating to generate the image data in response to reception of the scanning start instruction from the data processing device,
   wherein the image scanning device further includes a data analyzing unit configured to analyze the image data to determine whether prescribed keywords are contained in the image data if the image data is generated in response to the scanning start instruction from the data processing device, and
   wherein the display lock judging unit is further configured to judge that the display lock is necessary if the prescribed keywords are contained in the image data as a result of analyze by the data analyzing unit.

2. The image scanning system according to claim 1, wherein the data processing device further includes a second display lock judging unit.

3. The image scanning system according to claim 2, wherein the second display lock judging unit judges that the display lock is necessary if the image data is generated in response to a user operation of the image scanning device.

4. The image scanning system according to claim 2, wherein the data processing device further includes a second data analyzing unit configured to analyze the image data to determine whether prescribed keywords are contained in the image data,
   wherein the second display lock judging unit is further configured to judge that the display lock is necessary if the prescribed keywords are contained in the image data as a result of analyze by the second data analyzing unit.

5. The image scanning system according to claim 1,
   wherein the first display unit includes a display execution unit which receives the image data from the first reception unit and processes the received image data to display the image data on the first display unit, and
   wherein the display control unit disables display of the image data by preventing the image data from being transferred from the first reception unit to the display execution unit.

6. The image scanning system according to claim 1,
   wherein the display control unit is configured to disable the data processing device from displaying the image data by setting the data processing device to a log-off state if the display lock judging unit judges that the display lock is necessary.

7. A computer readable storage device containing a program for a computer which is configured to receive image data from a scanning device, the program containing instructions which cause the computer to executed the steps of:
   receiving the image data from the scanning device;
   judging whether scanning of the image data received from the scanning device had been started by an instruction transmitted from the computer or by an instruction input via an input unit on the scanning device;
   disabling displaying of the received image data if the scanning of the received image data received from the scanning device had been started by the instruction input via the input unit on the scanning device; and
   enabling displaying of the received image data if the scanning of the image data received from the scanning device had been started by the instruction transmitted from the computer.

8. The computer readable storage device according to claim 7, wherein the instructions further include the step of analyzing the image data to determine whether prescribed keywords are contained in the image data, and wherein the judging step further comprises judging whether the image data is allowed to be displayed based on the prescribed keywords are contained in the image data as a result of analyze by the analyzing step.

9. The computer readable storage device according claim 7, wherein the instructions are contained in a device driver configured to control an operation of the scanning device.

10. An image scanning device communicably connected to a data processing device which is configured to receive image data and display the image data on a display unit, the image scanning device comprising:

an input unit comprising:

a first button configured to receive a first mode instruction; and a second button configured to receive a second mode instruction;

an image scanner configured to, in response to the receipt of one of the first mode instruction and the second mode instruction, start scanning an image and generating image data representing the scanned image;

an image data transmission unit configured to transmit the image data to the data processing device; and a command transmission unit configured to transmit a display lock command for disabling the data processing device from displaying the image data received from the image scanning device on the display unit when the first mode instruction is received, wherein the display lock command is not transmitted when the second mode instruction is received.

11. The image scanning device according to claim 10, wherein the display lock command is transmitted prior to the image scanner scanning the image.

* * * * *